(12) United States Patent
Choo (10) Patent No.: US 7,929,079 B2
(45) Date of Patent: Apr. 19, 2011

(54) METHOD FOR MANUFACTURING POLARIZER AND LASER PROCESSING APPARATUS FOR MANUFACTURING THE POLARIZER

(75) Inventor: Dae-Ho Choo, Seongnam-si (KR)

(73) Assignee: Samsung Electronics Co., Ltd. (KR)

( * ) Notice: Subject to any disclaimer, the term of this patent is extended or adjusted under 35 U.S.C. 154(b) by 862 days.

(21) Appl. No.: 11/758,296

(22) Filed: Jun. 5, 2007

(65) Prior Publication Data

US 2007/0284346 A1    Dec. 13, 2007

(30) Foreign Application Priority Data

Jun. 8, 2006    (KR) .......................... 10-2006-0051396

(51) Int. Cl.
*G02F 1/1335*    (2006.01)
(52) U.S. Cl. ......................................................... 349/96
(58) Field of Classification Search ........................ None
See application file for complete search history.

(56) References Cited

U.S. PATENT DOCUMENTS

| 2006/0256260 | A1* | 11/2006 | Gon et al. ........................ 349/96 |
| 2008/0018997 | A1* | 1/2008 | Kawazu et al. ................ 359/486 |
| 2008/0117509 | A1* | 5/2008 | Hayashi et al. ................ 359/486 |

FOREIGN PATENT DOCUMENTS

| JP | 2006017879 | 1/2006 |
| JP | 2006047829 | 2/2006 |

* cited by examiner

*Primary Examiner* — Sung H Pak
(74) *Attorney, Agent, or Firm* — Cantor Colburn LLP (57) ABSTRACT

A method for manufacturing a polarizer includes forming a conductive thin film layer on a first surface of a substrate. The conductive thin film layer corresponding to a processing line is partially removed by a treatment laser beam irradiated along the processing line. The removing the conductive thin film layer forms a plurality of groove lines on a portion of the substrate from which the conductive thin film is removed and a plurality of striped lines formed on a portion of the substrate on which the conductive thin film remains between the groove lines.

10 Claims, 7 Drawing Sheets

METHOD FOR MANUFACTURING POLARIZER AND LASER PROCESSING APPARATUS FOR MANUFACTURING THE POLARIZER

This application claims priority to Korean Patent Application No. 2006-51396, filed on Jun. 8, 2006, and all the benefits accruing therefrom under 35 U.S.C. §119, the contents of which are herein incorporated by reference in its entirety.

BACKGROUND OF THE INVENTION

1. Field of the Invention

The present invention relates to a method for manufacturing a polarizer and a laser processing apparatus for manufacturing the polarizer. More particularly, the present invention relates to a method for manufacturing a polarizer having a plurality of stripe lines formed on a surface of the polarizer and a laser processing apparatus for manufacturing the polarizer.

2. Description of the Related Art

A liquid crystal display ("LCD") apparatus includes an LCD panel and a backlight assembly. The LCD panel includes a thin film transistor ("TFT") substrate, a color filter substrate, and a liquid crystal disposed between the TFT substrate and the color filter substrate. Since the LCD panel is a passive element that does not emit light by itself, the backlight assembly providing the LCD panel with light has great influence on a brightness of images displayed in the LCD panel.

The LCD apparatus includes polarizing plates disposed on upper and lower surfaces of the LCD panel, such that the liquid crystal operates as a light shutter. The polarizing plate transmits a light polarized in a predetermined direction. The polarizing plate transmits theoretically a maximum of half of the total light generated by the backlight assembly. However, the polarizing plate practically transmits about 43% of the total light generated by the backlight assembly.

In order to increase the amount of light passing through the polarizing plate, a dual brightness enhancement film ("DBEF") may be disposed between the backlight assembly and the polarizing plate.

However, a cost of the polarizing plate is about 25% to 30% of a total cost of elements of the LCD panel. Additionally, a cost of the DBEF is very high. Therefore, when the LCD apparatus includes the DBEF with the polarizing plate, a manufacturing cost of the LCD apparatus is greatly increased.

In a large or medium sized LCD apparatus, such as a large size television receiver set, a monitor, a notebook personal computer ("NPC"), etc., a size of a mother board has been increased. The number of unit cells is increased, as the size of the mother board is increased. Since a polarizing plate is adhered to each of the unit cells, many processes that adhere the polarizing plate to the unit cell are required for manufacturing an LCD apparatus. Therefore, it is necessary that a polarizer is formed in an area corresponding to the whole mother board. Multi-step, relatively costly and inefficient photolithographic methods of forming a polarizer may include plating the conductive thin film layer together with a photo resist, hardening the photo resist, aligning a mask, exposing, developing, hardening, etching the conductive thin film layer, and stripping the photo resist. In a similar fashion, laser-interference-lithograph methods of forming a polarizer may include plating the conductive thin film layer with a photo resist, soft hardening, hard hardening, patterning the photo resist through exposing the photo resist to excimer laser beams interfering each other without using a photo-mask, etching the conductive thin film layer, and stripping the photo resist. Therefore, a simpler and more cost effective method of forming a polarizer is required.

BRIEF SUMMARY OF THE INVENTION

An exemplary embodiment provides a method of manufacturing a polarizer including a plurality of stripe lines directly processed by a laser beam with accuracy of nanoscale.

An exemplary embodiment further provides a laser processing apparatus generating the above laser beam for processing the stripe lines.

An exemplary embodiment of a method of manufacturing a polarizer includes forming a conductive thin film on a first surface of a substrate and partially removing the conductive thin film corresponding to a plurality of processing lines. The removing the conductive thin film includes irradiating treatment laser beams along the processing lines and forming a plurality of groove lines at a portion of the substrate from which the conductive thin film is removed and a plurality of stripe lines formed of the conductive thin film remaining between the groove lines.

In an exemplary embodiment, the treatment laser beams are one among F2 typed laser beams having a wavelength of about 157 nm, ArF typed laser beams having a wavelength of about 190 nm, KrF typed laser beams having a wavelength of about 250 nm, and Femto-second laser beams having a wavelength of about 780 nm. Thus, a width of each of the striped lines and a pitch defined as a distance between striped lines are in a range of about 120 nm to about 200 nm.

In an exemplary embodiment, partially removing the conductive thin film includes irradiating the treatment laser beams along a first processing lines of the processing lines to form first groove lines, moving the substrate relative to irradiation points onto which the treatment laser beams are irradiated, and irradiating the treatment laser beams along second processing lines of the processing lines to form second groove lines. An align pattern formed on a portion of the substrate may be used for relatively moving the substrate. Also, striped lines including conductive thin film remaining between the first groove lines may be used for relatively moving the substrate.

An exemplary embodiment of a laser processing apparatus includes a laser source, a light-adjusting module, a light splitting module, and a light cross-section modulating module. The laser source emits a source laser beam. The light-adjusting module converts the source laser beam into a parallel laser beam. The light splitting module splits the parallel laser beam into a plurality of processing laser beams and emits the processing laser beams in one direction. The light cross-section modulating module converts each of the processing laser beams into a treatment laser beam having a long oval shaped cross-section and emits the treatment laser beam.

In an exemplary embodiment, the laser source emits one among a F2 typed laser beam having a wavelength of about 157 nm, an ArF typed laser beam having a wavelength of about 190 nm, a KrF typed laser beam having a wavelength of about 250 nm, and a Femto-second laser beam having a wavelength of about 780 nm.

In an exemplary embodiment of a method for manufacturing a polarizer and the laser processing apparatus, processes for manufacturing a polarizer may be simplified. Also, a number of an optical member, such as a polarizer, employed to a display apparatus may be reduced.

BRIEF DESCRIPTION OF THE DRAWINGS

The above and other features and advantages of the present invention will become more apparent by describing in detailed example embodiments thereof with reference to the accompanying drawings, in which.

DETAILED DESCRIPTION OF THE INVENTION

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity.

It will be understood that when an element or layer is referred to as being "on" or "connected to" another element or layer, it can be directly on or connected to the other element or layer or intervening elements or layers may be present. In contrast, when an element is referred to as being "directly on" or "directly connected to" another element or layer, there are no intervening elements or layers present. Like numbers refer to like elements throughout. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "lower," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "lower" relative to other elements or features would then be oriented "upper" the other elements or features. Thus, the term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

Hereinafter, the present invention will be explained in detail with reference to the accompanying drawings.

An exemplary embodiment of a method of manufacturing a polarizer according to the present invention includes forming a conductive thin film on a first surface of a substrate and partially removing the conductive thin film corresponding to a plurality of processing lines. The removing the conductive thin film may include irradiating laser beams along the processing lines to form a plurality of groove lines formed from a portion of the substrate and a plurality of stripe lines formed from a portion of the conductive thin film remaining between the groove lines. As used herein, "corresponding" may be considered as corresponding substantially in shape, size or positional placement relative to another element or feature.

Figure 1:
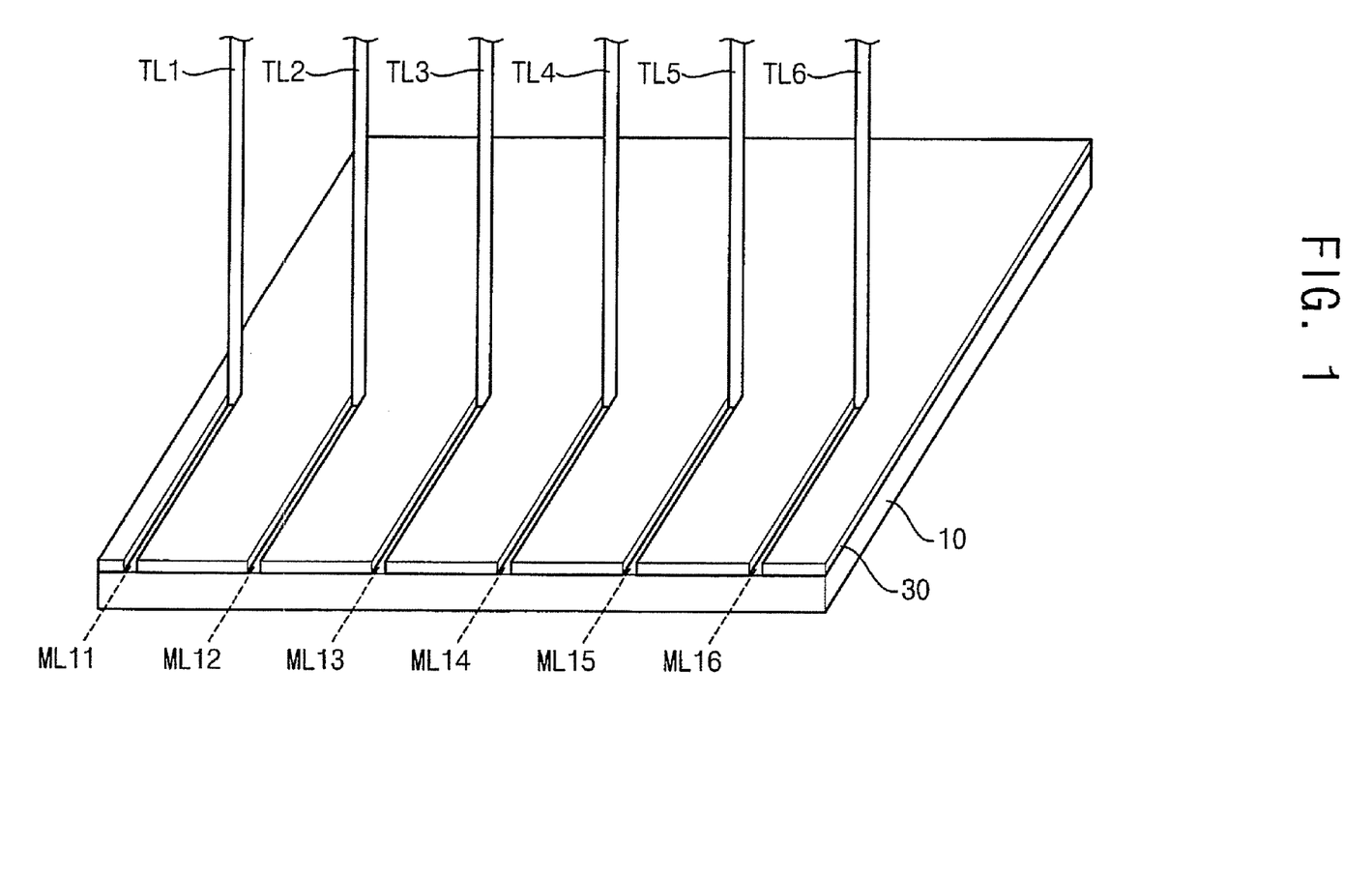
FIG. 1 is a perspective view illustrating an exemplary embodiment of a polarizer processed by a laser beam according to a method for manufacturing a polarizer of the present invention.

FIG. 1 is a perspective view illustrating an exemplary embodiment of a polarizer processed by a laser beam according to a method for manufacturing a polarizer of the present invention.

Referring to FIG. 1, a conductive thin film layer 30 is formed on a surface (e.g., an upper surface) of a substrate 10. The substrate 10 may include, but is not limited to, glass. The conductive thin film layer 30 may be formed through sputtering a metal having a relatively high reflectivity on a surface of the substrate 10 or plating the metal on the surface of the substrate 10. The metal having the relatively high reflectivity may include, but is not limited to, aluminum (Al), aluminum neodymium (AlNd), aluminum molybdenum (AlMo), silver (Ag), copper (Cu), gold (Au), molybdenum (Mo), etc.

The conductive thin film layer 30 may have a thickness of several hundred nano-meters (nm). In one exemplary embodiment, the conductive thin film 30 has a thickness of about 200 to 400 nano-meters. When the conductive thin film layer 30 is formed through the sputtering method, the metal of the conductive thin film layer 30 may be formed at a relatively low-temperature to minimize heat damage of the substrate 10.

Figure 2:
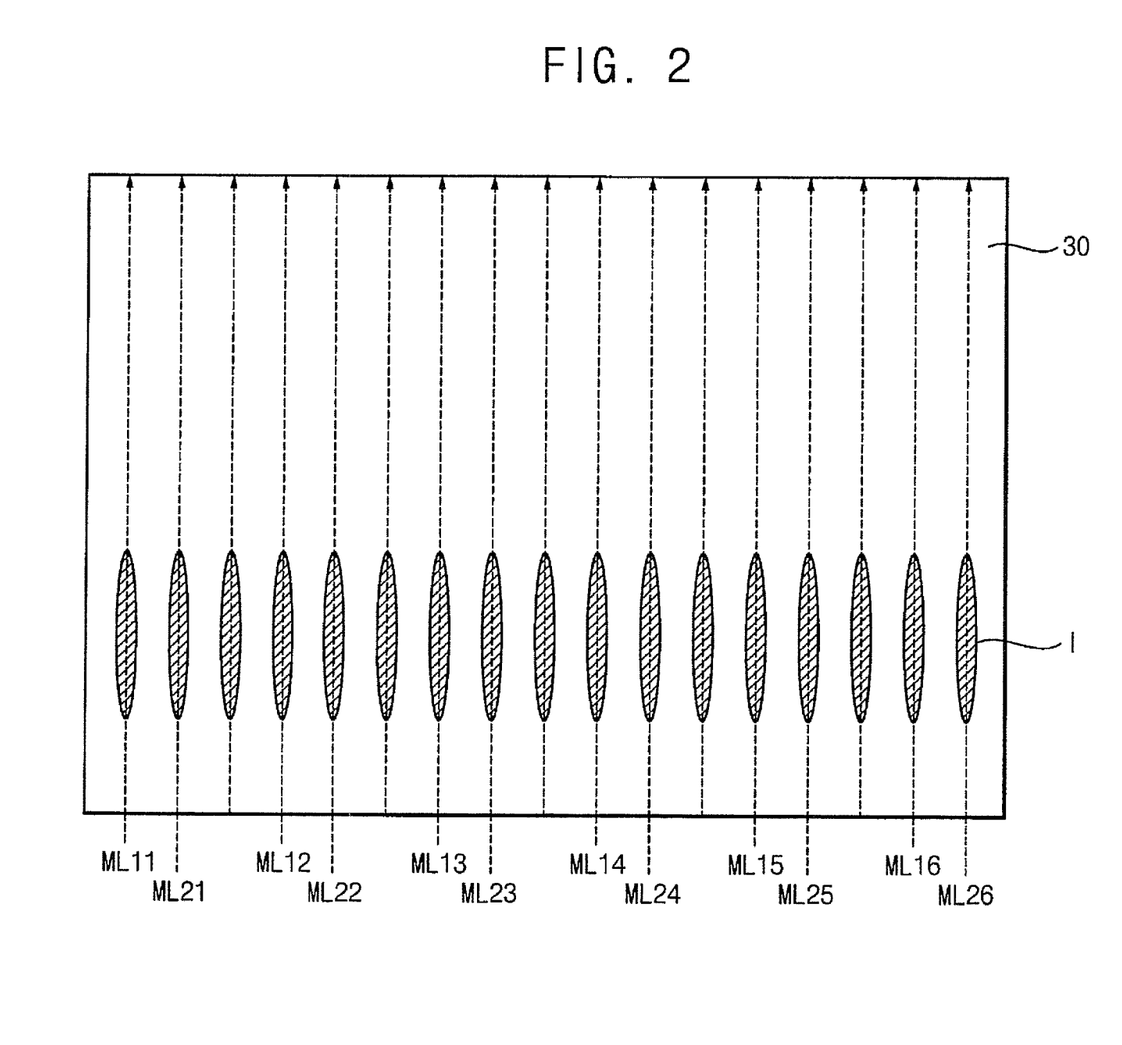
FIG. 2 is a plan view illustrating another exemplary embodiment of a polarizer processed by a laser beam in accordance with the present invention.

FIG. 2 is a plan view illustrating another exemplary embodiment of a polarizer processed by a laser beam in accordance with the present invention.

As shown in FIGS. 1 and 2, the substrate 10 is aligned under a laser processing apparatus. The laser processing apparatus irradiates treatment laser beams TL1, TL2, TL3, TL4, TL5 and TL6 along irradiation paths. Each of the treatment laser beams has a predetermined-shaped cross-section for processing the conductive thin film layer 30. As in the illustrated exemplary embodiments, each of the treatment laser beams has a relatively long oval shaped cross-section, such as when viewed on a plan view. The substrate 10 is disposed at a position where the processing laser beams generated from the laser processing apparatus are focused such as to form the long oval shape "I" on the conductive thin film layer 30.

A plurality of processing lines substantially parallel to each other is formed on the conductive thin film layer 30. The substrate 10 is disposed such that a longitudinal direction of the long oval shape is substantially parallel to the processing line. The treatment laser beams TL1, TL2, TL3, TL4, TL5 and TL6 respectively correspond a portion of the processing lines.

The treatment laser beams TL1, TL2, TL3, TL4, TL5 and TL6 are respectively irradiated to the corresponding processing lines and remove portions of the conductive thin film layer 30 corresponding to the processing lines. Consequently, a plurality of stripe lines arranged in a stripe type pattern is formed on the substrate 10.

In one exemplary embodiment, irradiating the treatment laser beams TL1, TL2, TL3, TL4, TL5 and TL6 to form the stripe lines includes laser processing processes. For convenience, two serial processes will be described hereinafter. A portion of the processing lines onto which the treatment laser beams TL1, TL2, TL3, TL4, TL5 and TL6 are irradiated are defined as first processing lines ML11, ML12, ML13, ML14, ML15, and ML16 and another portion of the processing lines are defined as second processing lines ML21, ML22, ML23, ML24, ML25 and ML26.

The treatment laser beams TL1, TL2, TL3, TL4, TL5 and TL6 are irradiated along the first processing lines ML11, ML12, ML13, ML14, ML15 and ML16. Heat energy of the treatment laser beams removes portions of the conductive thin film layer 30 corresponding to the first processing lines ML11, ML12, ML13, ML14, ML15, and ML16. Consequently, groove lines are formed along the first processing lines ML11, ML12, ML13, ML14, ML15, and ML16. The groove lines expose the substrate 10 as illustrated in FIG. 1.

Figure 3:
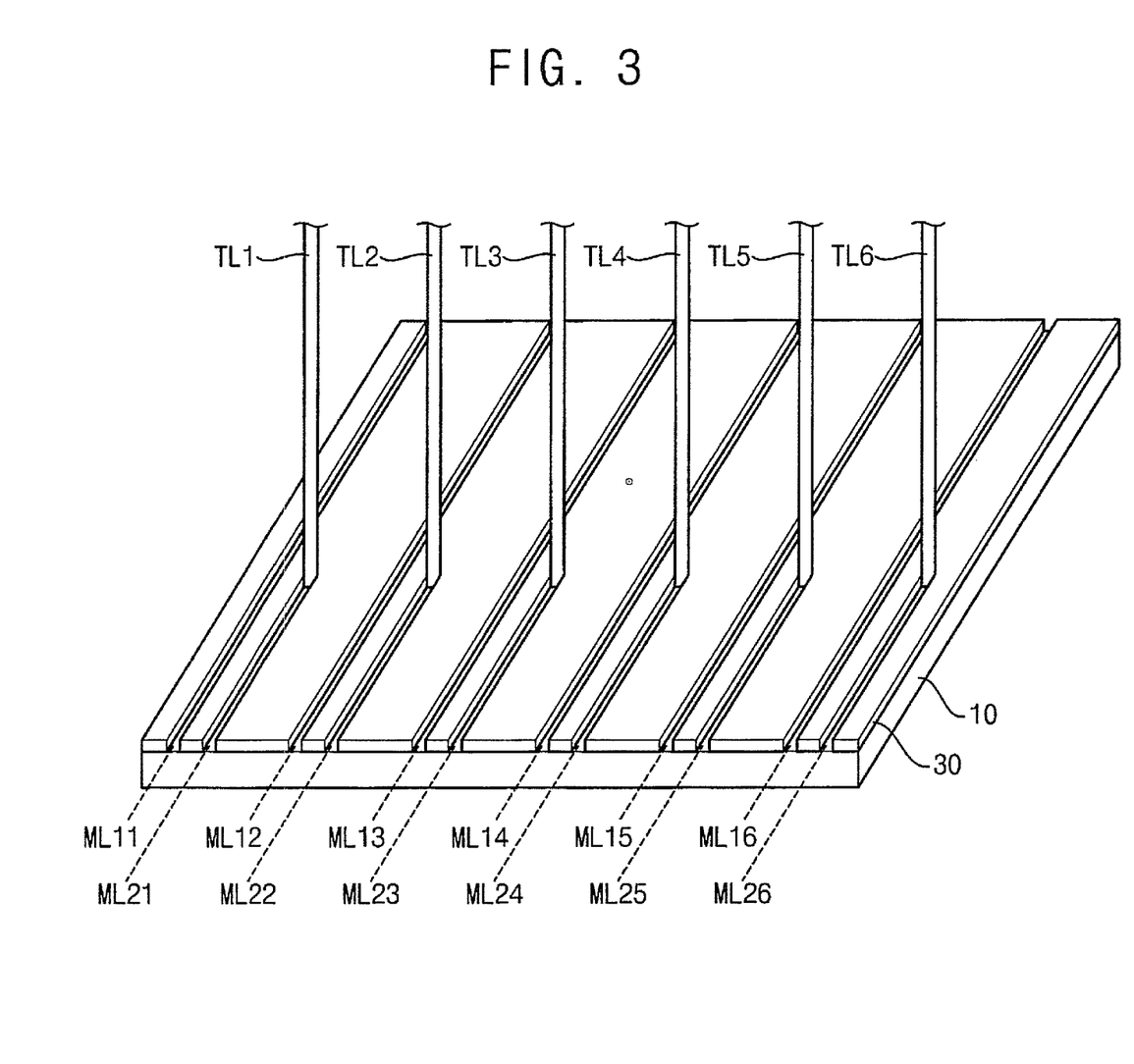
FIG. 3 is a perspective view illustrating an exemplary embodiment of a polarizer having a processing line different from that of the polarizer shown in FIG. 2.

FIG. 3 is a perspective view illustrating a polarizer having a processing line different from that of the polarizer shown in FIG. 2.

As shown in FIG. 3, a position of the substrate 10 and/or the treatment laser beams is changed so that paths onto which the treatment laser beams TL1, TL2, TL3, TL4, TL5 and TL6 are irradiated are changed. When the position of the substrate 10 and/or the treatment laser beams is changed, a stripe line or a groove line already formed on the substrate 10 may be used as an align pattern to relatively move the substrate 10 and/or the treatment laser beams.

In an exemplary embodiment, an align pattern (not shown) may be formed on a position of the substrate 10, such as where the stripe lines are not formed, is used as a guide for changing a position of the substrate 10 and/or the treatment laser beams. The align pattern may be formed on the substrate 10 before the striped lines are formed on the substrate 10. Alternatively, the align pattern and the striped lines may be simultaneously formed on the substrate 10.

The treatment laser beams TL1, TL2, TL3, TL4, TL5 and TL6 are respectively aligned at the second processing lines ML21, ML22, ML23, ML24, ML25 and ML26 through the changing of the relative positions of the substrate 10 and the treatment laser beams TL1, TL2, TL3, TL4, TL5 and TL6 relative to each other.

The treatment laser beams TL1, TL2, TL3, TL4, TL5 and TL6 are irradiated along the second processing lines ML21, ML22, ML23, ML24, ML25 and ML26 to partially remove the conductive thin film layer 30 corresponding to the second processing lines ML21, ML22, ML23, ML24, ML25, and ML26. Consequently, a second group of groove lines are formed along the second processing lines ML21, ML22, ML23, ML24, ML25, and ML26.

Figure 4:
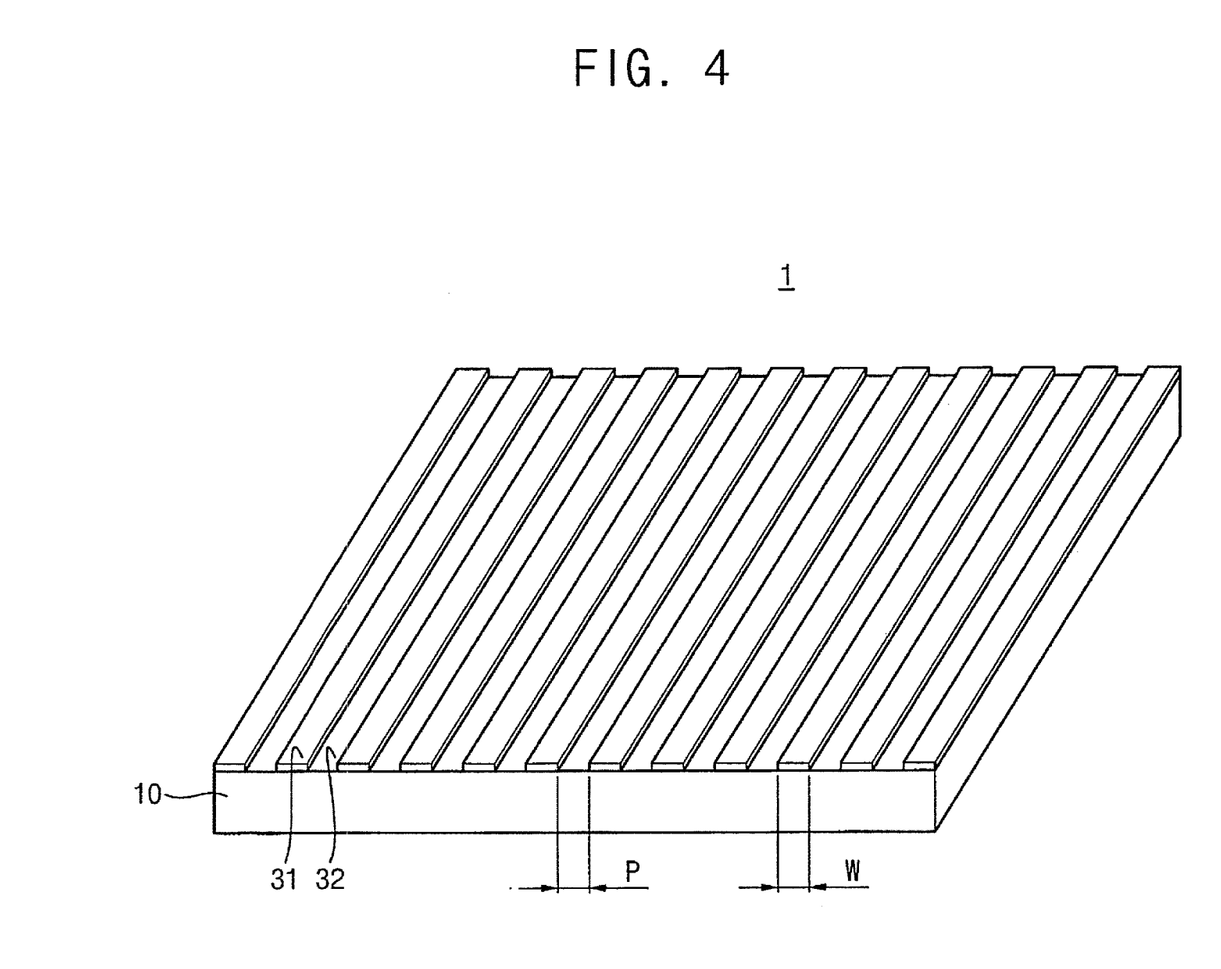
FIG. 4 is a perspective view illustrating another exemplary embodiment of a polarizer manufactured by a method according to the present invention.

FIG. 4 is a perspective view illustrating another exemplary embodiment of a polarizer manufactured by a method according to the present invention.

In the illustrated embodiments, the treatment laser beams are irradiated onto the conductive thin film layer 30 formed on the substrate 10. The treatment laser beams are irradiated along the processing lines through a number of laser processing processes, such as serially performed. As shown in FIG. 4, a plurality of groove lines 32 and a plurality of striped lines 31 defined by the conductive thin film layer 30 remaining between the groove lines 32 are formed on the substrate 10.

A pitch "P" defined by a spacing distance between outer edges of two adjacent striped lines 31, a width "W" defined by a distance between outer edges of a stripe line 31 and a height defined from an upper edge of a striped line to the upper surface of the substrate 10 in a direction substantially perpendicular to the upper surface of the substrate 10 of each of the striped lines 31 may have effect on a polarizing function of the striped lines 31. When the striped lines 31 are used as a polarizer which polarizes a light having a relatively long wavelength, the pitch "P" has a substantial effect on the polarizing function of the striped lines 31. In an exemplary embodiment, the pitch "P" should be smaller than a wavelength of an incident light in order for the striped lines 31 to function as the polarizer. When the pitch "P" is larger than the wavelength of the incident light, the striped lines 31 do not function as the polarizer but instead function as a diffractor diffracting the incident light.

When the polarizer 1 is used as a substrate of a display panel, the striped lines 31 may have a relatively high polarization capability of polarizing a visible ray because the display panel uses the visible ray to display images. In one exemplary embodiment, the pitch "P" may be smaller than about 400 nm because a wavelength of the visible ray is in a range of about 400 nm to about 700 nm. The width "W" of the stripe line 31 may also be minimized. In one exemplary embodiment, the striped line has a width "W" of about 100 nm or less such as in a previous processing operation forming a space between the stripes 31 (e.g., pitch "P"). Accordingly, the pitch "P" may be about 200 nm or less.

In exemplary embodiments, when a laser beam makes contact with a medium, the laser beam is diffracted. A diffraction width of the laser beam is smaller than a wavelength of the laser beam. Accordingly, the diffraction of the laser beam has relatively little effect on resolution of the laser beam when the stripe line does not have a minute width. However, the resolution may be largely reduced by the diffraction of the laser beam when the striped line does have a minute width. In an exemplary embodiment, a laser beam has a wavelength of about 200 nm or less in order to process the stripe line 31 having a relatively small (e.g., minute) width "W" and a minute pitch "P" of about 200 nm or less. In one exemplary embodiment the pitch "P" and the width "W" are in a range of about 120 nm to about 200 nm.

In an exemplary embodiment, the laser beam may be substantially continuously irradiated onto the conductive thin film layer 30 with substantially constant intensity, or discontinuously irradiated to the conductive thin film layer 30 with substantially constant frequency. When the laser beam is continuously irradiated with constant intensity, excessive heat may be generated in the conductive thin film layer 30. So as to not generate excessive heat in the conductive thin film layer 30, the laser beam may be discontinuously irradiated onto the conductive thin film layer 30 with constant frequency. Hereinafter, the constant frequency is referred to as oscillation frequency.

The oscillation frequency of the laser beam has influence on a processing effect of the conductive thin film layer 30. When the oscillation frequency becomes larger than a predetermined critical value, a width of a portion of the conductive thin film vaporized by heat becomes smaller than a wavelength of the laser beam. In an exemplary embodiment, the laser beam may have a wavelength of about 250 nm or less in order to process the striped line 31 having a width of about 200 nm or less.

In the illustrated embodiments, the treatment laser beam may include one of a F2 typed laser beam having a wavelength of about 157 nm, an ArF typed laser beam having a wavelength of about 190 nm, a KrF typed laser beam having a wavelength of about 250 nm, and a Femto-second laser beam having a wavelength of about 780 nm.

A wavelength of the Femto-second laser beam is larger than that of the F2-typed laser beam. However, when the oscillation frequency of the Femto-second laser beam becomes relatively larger, a width of the conductive thin film layer 30 zone affected by heat may become smaller than the wavelength of the Femto-second laser beam. Even though the wavelength of the Femto-second laser beam is larger than about 200 nm, the stripe line 31 may be processed to have a minute width "W" of about 200 nm or less.

In an exemplary embodiment, when the conductive thin film layer 30 is processed by the F2-typed laser beam, the ArF-typed laser beam, or the KrF-typed laser beam, the oscillation frequency is in a range of about one kilohertz to about one megahertz. When the conductive thin film layer 30 is processed by the Femto-second laser beam, the oscillation frequency may be about one megahertz or more.

Figure 5:
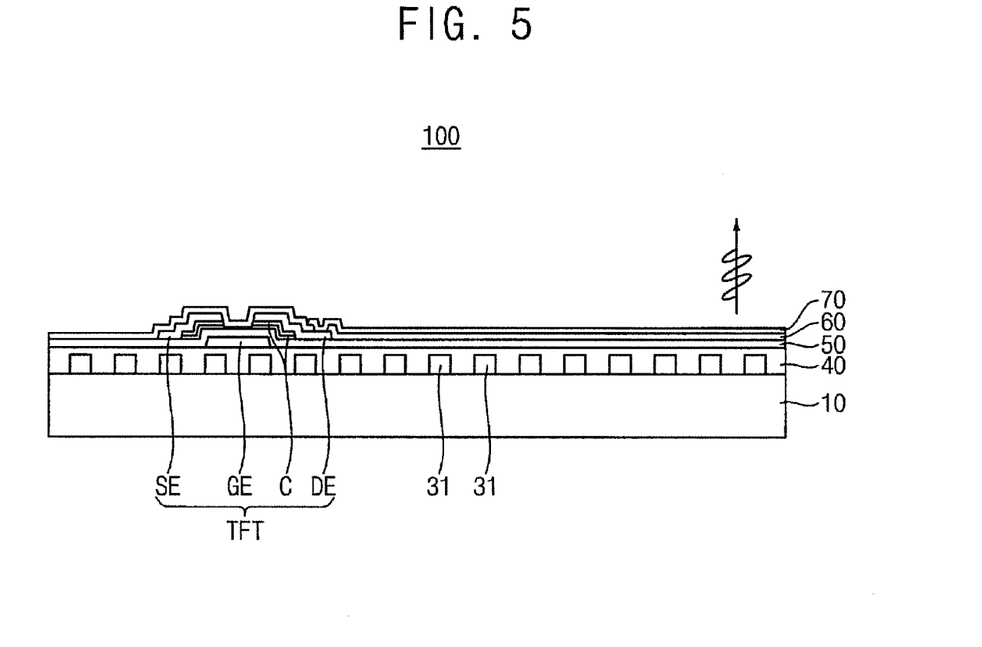
FIG. 5 is a cross-sectional view showing another exemplary embodiment of a polarizer manufactured by a method according to the present invention.

FIG. 5 is a cross-sectional view showing another exemplary embodiment of a polarizer manufactured by a method according to the present invention.

Referring to FIG. 5, the method for manufacturing a polarizer 100 is similar to that shown in FIGS. 1 to 4 except that the method for manufacturing the polarizer of FIG. 5 further includes forming a planarization layer 40 and forming a display element on the planarization layer 40. Thus, the same reference numerals will be used to refer to the same or like parts as those described in FIGS. 1 to 4.

A conductive thin film layer 30 is formed on a surface of a substrate 10. The conductive thin film layer 30 is processed to form a plurality of striped lines 31.

A planarization layer 40 covering the striped lines 31 is formed on the substrate 10 having the striped lines formed thereon. The planarization layer 40 may include a resin having high light transmissivity and/or high hardness.

The display element is formed on the planarization layer 40. The forming a display element includes forming a switching element and a forming a transparent electrode.

The switching element, such as a thin film transistor "TFT", is formed on the planarization layer 40. In one exemplary embodiment, a gate metal layer is formed on the planarization layer 40. The gate metal layer is patterned, such as through a photolithographic process, to form a gate line including a gate electrode "GE". A gate insulating layer 50 covering the gate line is formed on the planarization layer 40 having the gate line formed thereon. A semiconductor layer "C" is formed on a portion of the gate insulating layer 50 corresponding to the gate electrode "GE".

A source metal layer is formed on the surface (e.g., an upper surface) of the substrate 10 having the semiconductor layer formed thereon. The source metal layer is patterned to form a source line including a source electrode "SE" and a drain electrode "DE", such as through the photolithographic process. The thin film transistor "TFT" including the gate electrode "GE," the gate insulating layer 50, the semiconductor layer "C," the source electrode "SE," and the drain electrode "DE" is formed on the substrate 10.

A transparent electrode 70 electrically connected to the drain electrode "DE" is formed. A passivation layer 60 is formed on the substrate 10 having the thin film transistor "TFT" formed thereon. A transparent conductive layer is formed on the passivation layer 60 and patterned, such as through the photolithographic process, to form the transparent electrode 70.

Figure 6:
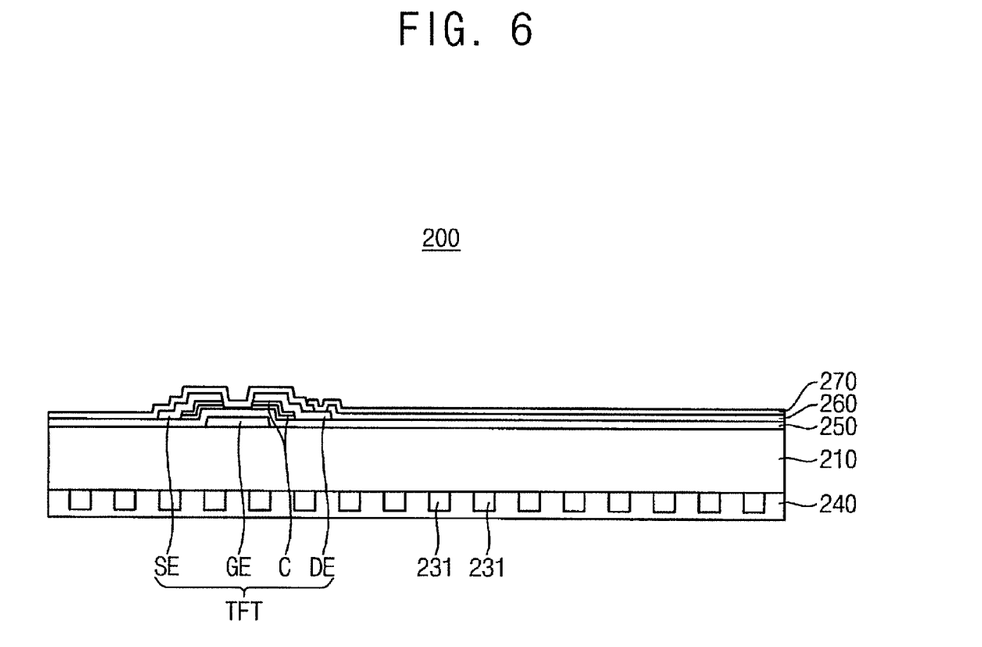
FIG. 6 is a cross-sectional view showing another exemplary embodiment of a polarizer manufactured by a method according to the present invention.

FIG. 6 is a cross-sectional view showing another exemplary embodiment of a polarizer manufactured by a method according to the present invention.

Referring to FIG. 6, the method for manufacturing a polarizer 200 according to the present exemplary embodiment is substantially the same as that shown in FIGS. 1 to 4 except that the method for manufacturing the polarizer of FIG. 6 further includes forming a planarization layer 240.

Also, the method of manufacturing a polarizer 200 is substantially the same as that shown in FIG. 5 except that the display element is formed on a second surface being opposite to the first surface of a substrate 210 and having striped lines 231 formed thereon.

A planarization layer 240 covering the striped lines 231 is formed on the first surface (e.g., an upper surface) of the substrate 210. The substrate 210 having the planarization layer 240 formed thereon is rotated, such as by 180 degrees, such that the second surface faces upward. A display element including the switching element "TFT" and the transparent electrode 270 is formed on the second surface, as shown in FIG. 6. As in the illustrated embodiment of FIG. 6, the display element "TFT" and the transparent electrode 270 are disposed opposite from and facing the planarization layer 240 and the striped lines 231 relative to the substrate 210.

The switching element, such as a thin film transistor "TFT", is formed on the second surface of the substrate 210. In one exemplary embodiment, a gate metal layer is formed on the second surface of the substrate 210. The gate metal layer is patterned, such as through a photolithographic process, to form a gate line including a gate electrode "GE". A gate insulating layer 250 covering the gate line is formed on the second surface of the substrate 210 and on the gate electrode "GE". A semiconductor layer "C" is formed on a portion of the gate insulating layer 250 corresponding to the gate electrode "GE".

A source metal layer is formed on the second surface of the substrate 210 having the semiconductor layer "C" formed thereon. The source metal layer is patterned to form a source line including a source electrode "SE" and a drain electrode "DE", such as through the photolithographic process. The thin film transistor "TFT" including the gate electrode "GE," the gate insulating layer 250, the semiconductor layer "C," the source electrode "SE," and the drain electrode "DE" is formed on the substrate 210.

A passivation layer 260 is formed on the substrate 210 having the thin film transistor "TFT" formed thereon. A transparent conductive layer is formed on the passivation layer 260 and is patterned, such as through the photolithographic process, to form the transparent electrode 270.

Figure 7:
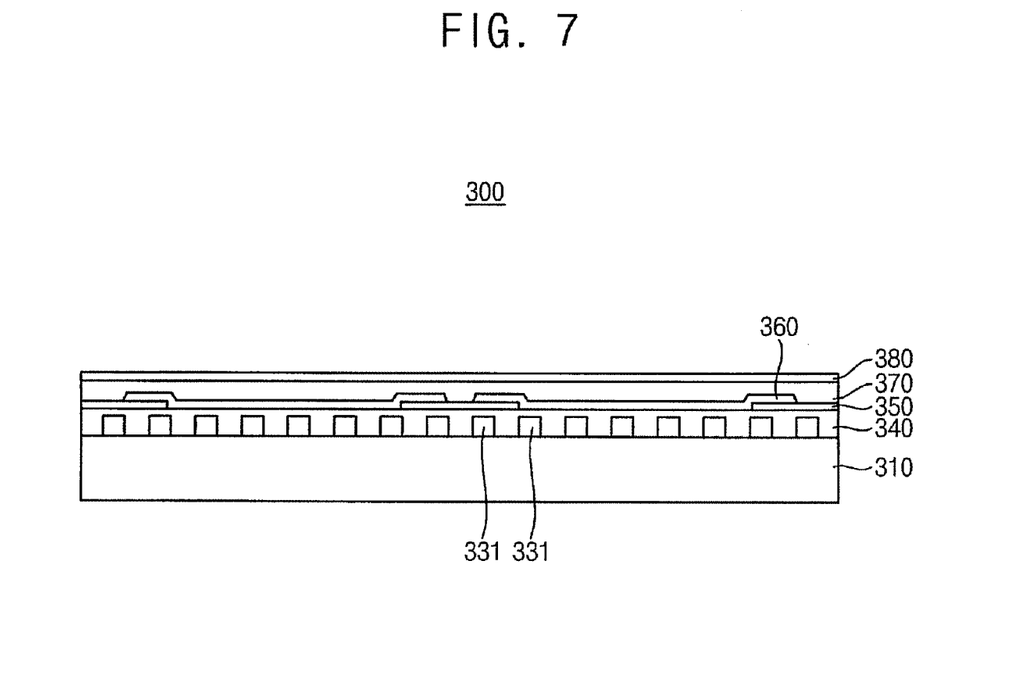
FIG. 7 is a cross-sectional view showing another exemplary embodiment of a polarizer manufactured by a method according to the present invention.

FIG. 7 is a cross-sectional view showing another exemplary embodiment of a polarizer manufactured by a method according to the present invention.

Referring to FIG. 7, the method for manufacturing a polarizer 300 is substantially the same as that shown in FIGS. 1 to 4 except that the method of manufacturing the polarizer 300 of FIG. 7 further includes forming a planarization layer 340 and forming a display element on the planarization layer 340.

A planarization layer 340 covering the striped lines 331 is formed on the first surface of a substrate 310. A display element is formed on the planarization layer 340.

The a display element includes forming a light shielding layer 350, forming a color filter layer 360, forming an overcoat layer 370 and forming a transparent electrode 380.

The light shielding layer 350 including openings arranged substantially in a matrix shape is formed on the planarization layer 340. The color filter layer 360 covering the openings of the light shielding layer 350 and a portion of the light shielding layer 350 is formed on the light shielding layer 350. The overcoat layer 370 is formed on the light shielding layer 350 having the color filter layer 360 formed thereon to compensate for a height difference between the color filter layer 360 and the light shielding layer 350. The transparent electrode 380 is formed on the substantially flat upper surface of the overcoat layer 370.

Figure 8:
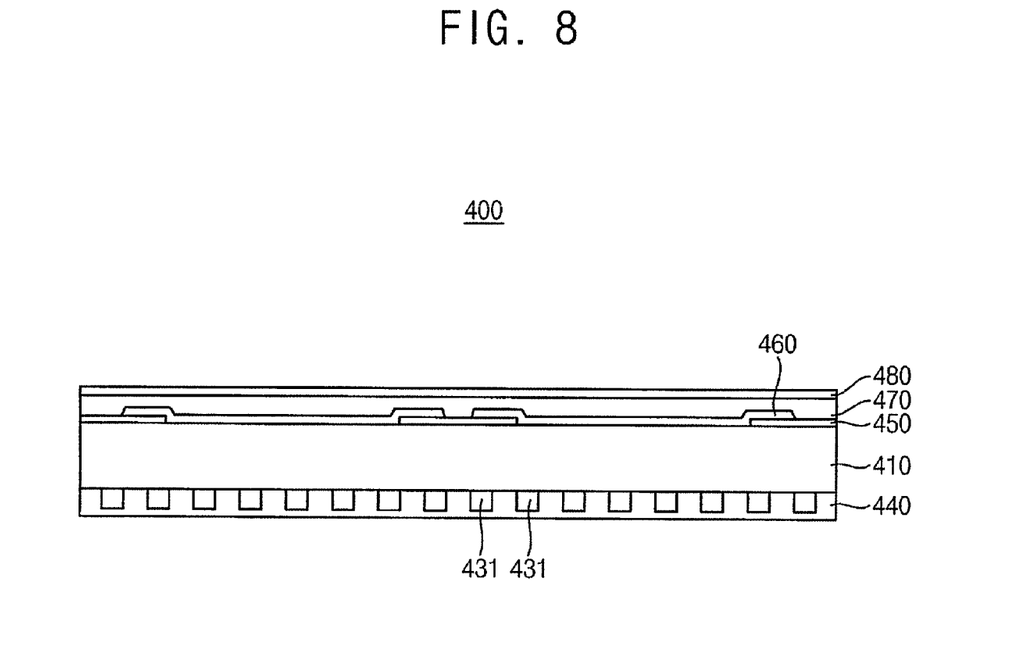
FIG. 8 is a cross-sectional view showing another exemplary embodiment of a polarizer manufactured by a method according to the present invention.

FIG. 8 is a cross-sectional view showing anther exemplary embodiment of a polarizer manufactured by a method according to the present invention.

Referring to FIG. 8, the method for manufacturing a polarizer 400 is substantially the same as that shown in FIGS. 1 to 4 except that the method of manufacturing the polarizer 400 of FIG. 8 further includes forming a planarization layer 440.

Also, the display element is substantially the same as that shown in FIG. 7. The method for manufacturing a polarizer 400 is substantially the same as that shown in FIG. 7 except that the display element is formed on a second surface of the substrate 410 opposite to a first surface of the substrate 410 having the striped lines 431 formed thereon.

Figure 9:
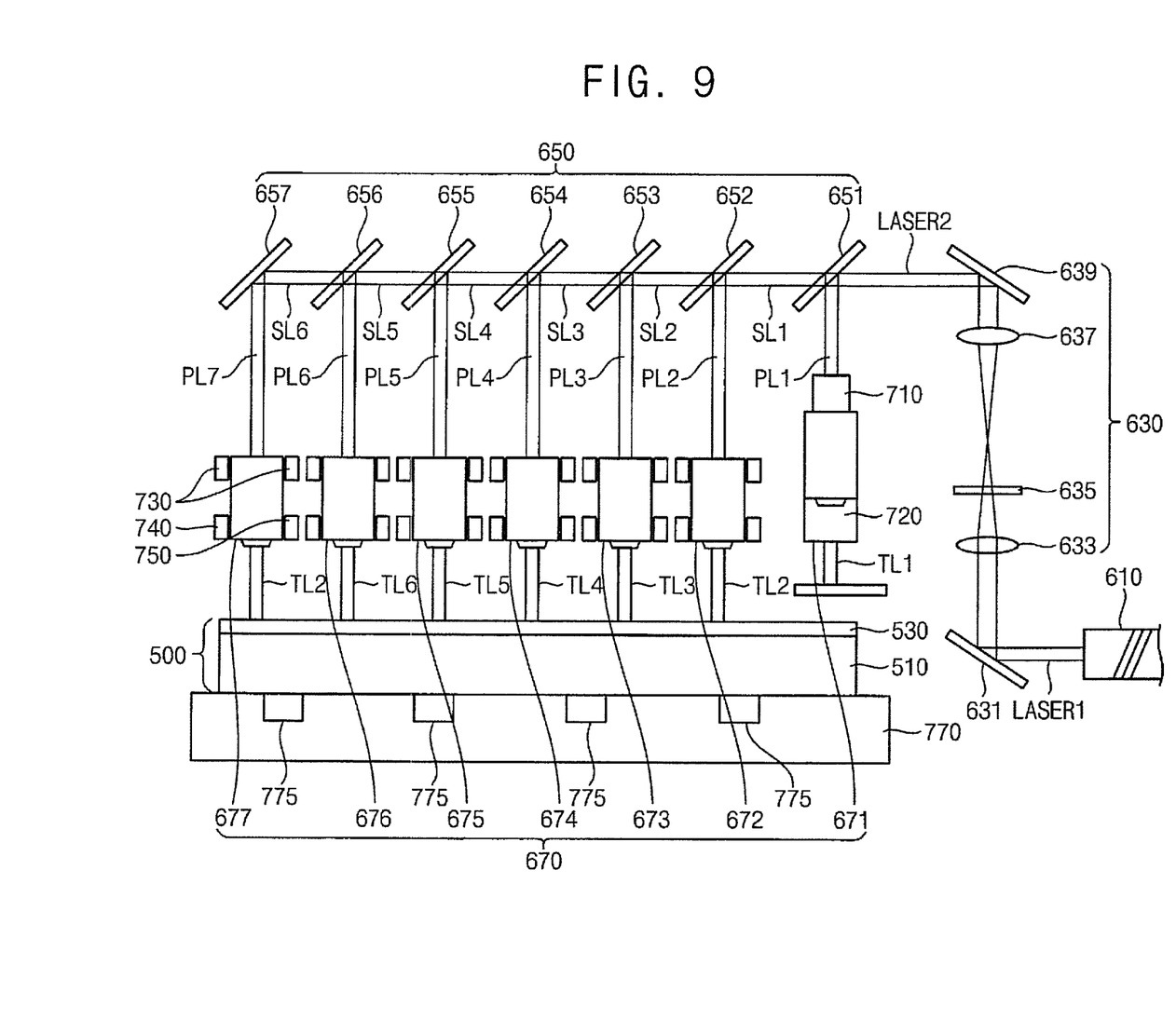
FIG. 9 is a cross-sectional view showing an exemplary embodiment of a laser processing apparatus used in forming a line pattern in accordance with the present invention.

FIG. 9 is a cross-sectional view showing an exemplary embodiment of a laser processing apparatus used in forming a line pattern in accordance with the present invention.

Referring to FIG. 9, the laser processing apparatus includes a laser source 610, a light-adjusting module 630, a light splitting module 650, and a light cross-section modulating module 670. The laser processing apparatus may directly process a thin film with a laser beam to form a power line pattern.

In one exemplary embodiment, the laser processing apparatus forms the striped lines 31, 231, 331 and 431 on the polarizer 1, 100, 200, 300, and 400 shown in FIGS. 1 to 8, respectively.

The laser source 610 emits a source laser beam "LASER1". The source laser beam may be one among a F2 typed laser beam having a wavelength of about 157 nm, an ArF typed laser beam having a wavelength of about 190 nm, a KrF typed laser beam having a wavelength of about 250 nm, and a Femto-second laser beam having a wavelength of about 780 nm.

The light-adjusting module 630 converts the source laser beam into parallel laser beams having a substantially uniform luminous intensity. The light-adjusting module 630 includes a first total reflection mirror 631, a first convex lens 633, a filter lens 635, a second convex lens 637 and a second total reflection mirror 639.

The first total reflection mirror 631, the first convex lens 633, the filter lens 635, the second convex lens 637 and the second total reflection mirror 639 are sequentially disposed in a path which the source laser beam passes along. The first total reflection mirror 631 totally reflects the source laser beam "LASER1" emitted from the laser source 610. The first convex lens 633 concentrates the source laser beam in order to uniformize properties of the source laser beam. The filter lens 635 is disposed between the first convex lens 633 and a focal point of the first convex lens 633. The filter lens 635 uniformizes a wavelength of the source laser beam passing through the first convex lens 633.

In exemplary embodiments, when the source laser beam is the F2-typed laser beam, the source laser beam has a wavelength of about 157 nm. When the source laser beam is the ArF-typed laser beam, the source laser beam has a wavelength of about 190 nm. When the source laser beam is the KrF-typed laser beam, the source laser beam has a wavelength of about 250 nm. When the source laser beam is the Femto-second laser beam, the source laser beam has a wavelength of about 780 nm. The wavelength of the source laser beam are selected to have the above-mentioned value based on the type of source laser beam because a width "W" and a pitch "P" of a power line pattern, such as the striped line shown in FIG. 1 to 8, made by the laser processing apparatus is about 200 nm or less.

The source laser beam passing through the filter lens 635 passes through the focal point and is diffused. Then, the diffused source laser beam enters the second convex lens 637. The second convex lens 637 converts the diffused source laser beam passing the focal point into the parallel laser beam having the substantially uniform luminous intensity.

The second total reflection mirror 639 essentially totally reflects the parallel laser beam passing through the second convex lens 637. The parallel laser beam "LASER2" reflected by the second total reflection mirror 639 has a substantially circular shaped cross-section. The parallel laser beam reflected by the second total reflection mirror 639 is considered to be a surface light and has a substantially uniform luminous intensity.

The light splitting module 650 splits the parallel laser beam "LASER2" reflected by the second total reflection mirror 639 into a plurality of processing laser beams and emits the processing laser beams in a first direction. The light splitting module 650 includes first to n-th semi-transmitting mirrors 651-656 and a third total reflection mirror 657.

The first to n-th semi-transmitting mirrors 651-656 and the third total reflection mirror 657 are sequentially disposed along a progress path of the parallel laser beam "LASER2". The first to n-th semi-transmitting mirrors 651-656 reflect a portion of the parallel laser beam "LASER2" in the first direction to convert the parallel laser beam "LASER2" into the processing laser beam, and transmits a remaining portion of the parallel laser beam "LASER2".

FIG. 9 shows the light splitting module 650 including first to sixth semi-transmitting mirrors 651, 652, 653, 654, 655, and 656 and a third total reflection mirror 657. However, the present invention is not limited thereto and may include any of a number of semi-transmitting mirrors and total reflection mirrors as are suitable for the purpose described herein.

First to seventh processing laser beams PL1, PL2, PL3, PL4, PL5, PL6, and PL7 respectively correspond to the processing laser beams respectively reflected by the first to sixth semi-transmitting mirrors 651, 652, 653, 654, 655, and 656 and the third total reflection mirror 657. Each of the first to seventh processing laser beams PL1, PL2, PL3, PL4, PL5, PL6, and PL7 has a circular shaped cross-section substantially the same as that of the parallel laser beam "LASER2".

First to sixth parallel laser beams SL1, SL2, SL3, SL4, SL5, and SL6 respectively correspond to the parallel laser beams transmitted by the first to sixth semi-transmitting mirrors 651, 652, 653, 654, 655, and 656. Accordingly, the seventh processing laser beam PL7 corresponds to a processing laser beam that is transmitted by the sixth semi-transmitting mirror 656 and is totally reflected by the third total reflection mirror 657.

In the illustrated embodiment, the first to seventh processing laser beams PL1, PL2, PL3, PL4, PL5, PL6, and PL7 have a substantially uniform luminous intensity. The luminous intensity of each of the first to seventh processing laser beams PL1, PL2, PL3, PL4, PL5, PL6, and PL7 is controlled by an angle of each of the first to sixth semi-transmitting mirror 651, 652, 653, 654, 655, and 656 and the third total reflection mirror 657. In the illustrated embodiment of FIG. 9, the first to sixth semi-transmitting mirrors 651, 652, 653, 654, 655, and 656 and the third total reflection mirror 657 are disposed to have a same angle with respect to a base surface on which the laser processing apparatus is disposed. However, the present invention is not limited thereto and may include any of a number of angles and/or combinations of angles of the semi-transmitting mirrors and total reflection mirror as are suitable for the purpose described herein.

The light cross-section modulating module 670 converts the first to seventh processing laser beams PL1, PL2, PL3, PL4, PL5, PL6, and PL7 into first to seventh treatment laser beams TL1, TL2, TL3, TL4, TL5, TL6, and TL7 and emits the first to seventh treatment laser beams TL1, TL2, TL3, TL4, TL5, TL6, and TL7. Each of the first to seventh treatment laser beams TL1, TL2, TL3, TL4, TL5, TL6, and TL7 has a long oval shaped cross-section. Resolution of a laser processing may be improved because each of the first to seventh treatment laser beams TL1, TL2, TL3, TL4, TL5, TL6, and TL7 has a long oval shaped cross-section.

The light cross-section modulating module 670 includes first to (n+1)-th cylindrical lenses.

In the present exemplary embodiment, the light cross-section modulating module 670 includes first to seventh cylindrical lenses 671, 672, 673, 674, 675, 676, and 677 respectively receiving the first to seventh processing laser beams PL1, PL2, PL3, PL4, PL5, PL6, and PL7.

The first to seventh cylindrical lenses 671, 672, 673, 674, 675, 676, and 677 are operated in a same way. The first cylindrical lens 671 will be described as an example hereinafter. The first cylindrical lens 671 has a multi-focal point forming a long oval shaped cross-section. Therefore, the first processing laser beam PL1 passing through the first cylindrical lens 671 has a long oval shaped cross-section.

The first to seventh treatment laser beams TL1, TL2, TL3, TL4, TL5, TL6, and TL7 emitted from the first to seventh cylindrical lenses 671, 672, 673, 674, 675, 676, and 677 is irradiated onto target 500. The target 500 includes a substrate 510 and a conductive thin film layer 530. In an exemplary embodiment, when the target 500 is one of the polarizers 1, 100, 200, 300, and 400 shown in FIGS. 1 to 8, the first to seventh treatment laser beams TL1, TL2, TL3, TL4, TL5, TL6, and TL7 are irradiated onto the conductive thin film layer 530 corresponding to the processing lines. In this occasion, the first to seventh treatment laser beams TL1, TL2, TL3, TL4, TL5, TL6, and TL7 are irradiated so that a longitudinal direction of the long oval shape is substantially parallel to the processing line.

The laser processing apparatus further includes a first observation unit 710 and a second observation unit 720. The first and second observation units 710 and 720 may include, but are not limited to, a type of microscope. The first observation unit 710 is disposed between the first semi-transmitting mirror 651 and the first cylindrical lens 671. The first observation unit 710 may be considered to be disposed over the first cylindrical lens 671. The first observation unit 710 observes a cross-section of the first processing laser beam PL1.

The second observation unit 720 is disposed between the first cylindrical lens 671 and the conductive thin film layer 530. The second observation unit 720 may be disposed under the first cylindrical lens 671. The second observation unit 720 observes a cross-section of the first treatment laser beam TL1.

When the cross-section of the first processing laser beam PL1 observed by the first observation unit 710 has a shape different from a predetermined circular shape beyond a first tolerance limit, the cross-section of the first treatment laser beam TL1 observed by the second observation unit 720 may have a shape different from a predetermined long oval shape beyond a second tolerance limit. When the shapes of the first processing laser beam PL1 and the first treatment laser beam TL1 are out of tolerance, a pattern formed on the conductive thin film layer 530, such as the striped line, may have a defect in a shape and/or a size of the pattern. Advantageously in the illustrated embodiment, when the cross-section of the first processing laser beam PL1 has a shape different from the predetermined circular shape (e.g., out of the first tolerance limit), operation of the laser processing apparatus can be stopped and the shape difference may be corrected.

The laser processing apparatus further includes a table 770 on which the target 500 is disposed. Defects induced by movement such as shaking of the table 770 are minimized because the treatment laser beams are aligned on the target 500 with an accuracy such as about several tens of nanometers (nm) to several hundreds of nanometers (nm). The table 770 may include a material that absorbs or reduced movement of the table 700. In one exemplary embodiment, the table may include, but is not limited to, a granite surface plate.

In changing a position of the target during manufacturing, the target may be damaged, such as by scratching. The target may be moved through a non-touch method to reduce or effectively prevent damaging or scratching of the target. In an exemplary embodiment, the laser processing apparatus further includes an air floater 775 as illustrated in FIG. 9. The air floater 775 sprays air through a path formed in the table 770 to float the target and move it.

The laser processing apparatus further includes an align module 730 changing positions of the first to seventh cylindrical lenses 671, 672, 673, 674, 675, 676, and 677.

In the illustrated embodiment, when the target 500 is processed by the laser processing apparatus, the table is moved to a predetermined position and/or the first and seventh cylindrical lens 671, 672, 673, 674, 675, 676, and 677 are moved to the predetermined position by the align module 730. However, it is preferable to move the table to the predetermined position because the first to seventh cylindrical lenses are aligned with accuracy of a nano-scale.

When the first to seventh treatment laser beams are irradiated onto the conductive thin film layer 530 along a portion of processing lines, a portion of the conductive thin film layer 530 corresponding to the portion of processing lines is vaporized and essentially removed completely. Particles of the conductive thin film layer 530 may remain around the groove lines formed along the processing lines. In an exemplary embodiment, the laser processing apparatus further includes an air blower 740 and an inhalator 750. The air blower 740 and the inhalator 750 are respectively disposed in a peripheral area of the first to seventh cylindrical lenses 671, 672, 673, 674, 675, 676, and 677.

The air blower 740 blows out ionized air. The ionized air removes static electricity of the particles of the conductive thin film layer 530 such that the particles are detached from the conductive thin film layer 530 remaining on the target. The inhalator 750 inhales the particles and removes the particles from the remaining conductive thin film layer 530.

In the illustrated embodiment, the method of manufacturing a polarizer can reduce the number of processes required to form a striped line diffracting light on a substrate in comparison with methods for manufacturing a polarizer by using a multi-step photolithographic method or a laser-interference-lithograph method.

As in the illustrated embodiment, the conductive thin film layer formed on a substrate is directly processed by a laser beam in order to form the striped lines. The methods of the illustrated embodiments require fewer processes than a more complicated photolithographic method or laser-interference-lithograph method.

Advantageously, productivity of processes that form a power line pattern, such as the striped line of the illustrated embodiment, on a substrate while maintaining an accuracy of about nano-scale is improved.

Having described the exemplary embodiments of the present invention and its advantage, it is noted that various changes, substitutions and alterations can be made herein without departing from the spirit and scope of the invention as defined by appended claims.

What is claimed is:

1. A method of manufacturing a polarizer, the method comprising:

forming a conductive thin film layer on a first surface of a substrate;

partially removing the conductive thin film layer corresponding to processing lines, wherein the removing the conductive thin film layer comprises irradiating treatment laser beams along the processing lines:

forming a plurality of groove lines on a first portion of the substrate from which the conductive thin film is removed; and forming a plurality of striped lines on a second portion of the substrate on which the conductive thin film remains between the groove lines, wherein the removing the conductive thin film layer further comprises:

irradiating the treatment laser beams along first processing lines of the processing, lines and forming first groove lines;

moving the substrate relative to irradiation points of the treatment laser beams; and irradiating the treatment laser beams along second processing lines of the processing lines and forming second groove lines which are different from the first groove lines; and wherein the first groove lines and the second groove lines are alternately formed with each other.

2. The method of claim 1, wherein the treatment laser beams are one selected from the group consisting of a F2 typed laser beam having a wavelength of about 157 nm, a ArF typed laser beam having a wavelength of about 190 nm, a KrF typed laser beam having a wavelength of about 250 nm, and a Femto-second laser beam having a wavelength of about 780 nm.

3. The method of claim 2, wherein a width of each of the striped lines and a pitch defined as a distance between adjacent striped lines are each in a range of about 120 nm to about 200 nm.

4. The method of claim 1, wherein a cross-section of the treatment laser beam formed on a processing point has an elongated oval shape.

5. The method of claim 4, wherein a longitudinal direction of the elongated oval shape is substantially parallel with the processing lines.

6. The method of claim 1, wherein the moving the substrate comprises using at least one of the groove lines as an align pattern to relatively move the substrate.

7. The method of claim 1, wherein the moving the substrate comprises using at least one of the stripe lines as an align pattern to relatively move the substrate.

8. The method of claim 1, wherein the removing the conductive thin film further comprises removing a residue of the conductive thin film which remains on the substrate from the treatment laser beams being irradiated onto the conductive thin film.

9. The method of claim 1, further comprising:

forming a planarization layer covering the striped lines; and forming a plurality of display elements on the planarization layer.

10. The method of claim 1, further comprising forming a planarizing layer cover the striped lines; and forming a plurality of display elements on a second surface of the substrate opposite to the first surface.

* * * * *